2,870,173

ANTHRAQUINONE DYESTUFFS

Peter Hindermann, Batterie, Basel, Hans Peter Kölliker, Basel, and Peter Trautzl, Binningen, Basel-Land, Switzerland, assignors to J. R. Geigy A.-G., Basel, Switzerland, a Swiss firm No Drawing. Application November 25, 1957
Serial No. 698,394

Claims priority, application Switzerland
December 28, 1956

7 Claims. (Cl. 260—373)

The present invention concerns a process for the production of 1-amino-4-arylaminoanthraquinone-2-sulphonic acids which, because of their affinity, are very suitable for the dyeing of natural and synthetic polypeptide material, in particular of wool, from a neutral to weakly acid bath. The invention also concerns the new acid anthraquinone dyestuffs as well as processes for the dyeing of polypeptide material using these dyestuffs, and finally, the material fast dyed with the aid of these dyestuffs.

It has been found that valuable reddish-blue anthraquinone dyestuffs of the general formula:

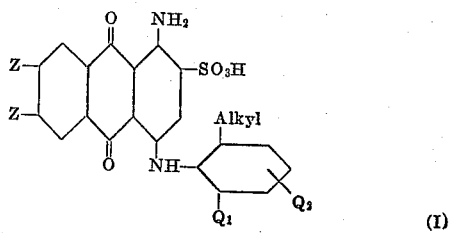

wherein each Z represents hydrogen or a halogen atom, $Q_1$ represents an alkyl group or an arylether group and $Q_2$ represents hydrogen, an alkyl group or an arylether group, and of $Q_1$ and $Q_2$, at least one represents an arylether group, are obtained if a 1-amino-4-halogen anthraquinone-2-sulphonic acid possibly further substituted by halogen in the 6- and/or 7-positions, is condensed with a 2-alkyl-1-aminobenzene aryl ether of the general formula:

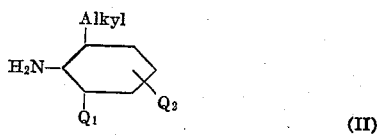

wherein $Q_1$ and $Q_2$ have the meanings given above and wherein the benzene ring can be further substituted by alkyl groups.

The 1-amino-4-halogen anthraquinone-2-sulphonic acids used in the process according to the present invention are either known or can be produced by known methods from known starting materials. For example, 1-amino-4 - bromo - 7 - chloro - anthraquinone - 2 - sulphonic acid, 1 - amino - 4 - bromo - 6.7 - dichloro - anthraquinone - 2- sulphonic acid, 1-amino-4.6-dichloro-anthraquinone-2-sulphonic acid, 1-amino-4.6-dibromo-anthraquinone-2-sulphonic acid and, in particular, 1-amino-4-bromo-anthraquinone-2-sulphonic acid are suitable.

Both oxygen ethers as well as thioethers can be used as 2-alkyl-1-aminobenzene aryl ethers of the general Formula II according to the present invention. The alkyl substituents thereof are advantageously low molecular and saturated; methyl and ethyl groups are preferred. The aryl radical of the aryl ether group can be of both the benzene or the naphthalene series. Compounds of particular interest are those in which the aryl ether radical is a phenyl ether group possibly having non-ionogenic substituents such as halogens, alkyl, aralkyl, aryl, alkyloxy or aryloxy groups as substituents.

The 2-alkyl-1-aminobenzene aryl ethers can be produced from known starting materials by usual methods. A simple production process consists in reacting at a moderately raised temperature in the presence of copper catalysts, suitable halogenated o-nitroalkylbenzene derivatives such as, for example, 2-methyl-6-chloro-1-nitrobenzene, 2.4 - dimethyl - 6 - chloro - 1 - nitrobenzene or 2.6 - dimethyl - 3 - or - 4 - bromo - 1 - nitrobenzene, with alkali metal phenolates, naphtholates, thiophenolates or thionaphtholates, and reducing the nitroethers to the corresponding amino-ethers. Examples of compounds usable acording to the present invention, of the general Formula II, are 3-methyl-2-amino-1-phenoxybenzene, 3-methyl - 2 - amino - 1 - (4'- or 3'- or 2' - methylphenoxy)-benzene, 3 - methyl - 2 - amino - 1(4' - tert. amyl- or 4'-benzyl- or 4' - phenyl - phenoxy) - benzene, 3 - methyl - 2- amino - 1 - (4' - phenoxyphenoxy) - benzene, 3 - methyl- 2 - amino - 1 - (1' - or 2'-naphthyloxy)-benzene, 3-methyl-2 - amino - 1 - (4' - methyl- or 4' - chlorophenyl - thio)-benzene, 2.4 - dimethyl - 3 - amino - 1 - phenoxybenzene and the 4' - methyl and 4' - chloro derivatives thereof, 3.5 - dimethyl - 4 - amino - 1 - phenoxy- or - 1 - phenyl-thiobenzene, 3.5 - dimethyl - 4 - amino - 1 - (4' - chlorophenylthio- or 4' - chlorophenoxy) - benzene, 3.5 - dimethyl - 4 - amino - 1 - (1'- or 2' - naphthyloxy) - benzene, 2.3.5.6 - tetramethyl - 4 - amino - 1 - phenoxybenzene and the 4' - methyl and 4' - chloro derivatives thereof, 3.5 - diethyl - 4 - amino - 1 - phenoxybenzene, 3.5 - diethyl - 4 - amino - 1 - (4' - methyl- or 4' - chlorophenoxy)-benzene and finally, 2.4.6-trimethyl-3-amino-1-phenoxybenzene as well as the 4'-chloro- and 4'-methyl-phenoxy compounds. Dyestuffs acording to the present invention which are derived from 2.6-dialkyl-1-aminobenzene-3- or -4-aryl ethers have particularly good wet fastness properties.

The 1-amino-4-halogen anthraquinone-2-sulphonic acids are condensed with the 2-alkyl-1-aminobenzene aryl ethers as defined by known methods, for example by heating the components to temperatures of 50–100°, in the presence of organic or inorganic diluents or solvents, a copper catalyst and an agent to neutralise the hydrogen halide formed in the reaction. Excess amine for example can be used as acid acceptor. The reaction can often be promoted by the addition of dispersing agents; performance of the reaction in an inert gaseous atmosphere is often recommended.

A modification of the process for the production of 1-amino-4-arylamino anthraquinone-2-sulphonic acids of the general Formula I consists in condensing 2-alkyl-1-aminobenzene aryl ethers of the general Formula II under similar conditions with 1-amino-2.4-di-halogen anthraquinones and then replacing the halogen atom in the 2-position of the anthraquinone nucleus by means of salts of sulphurous acid, in particular the alkali metal sulphites and, possibly, under pressure, by the sulphonic acid group.

The dyestuffs are isolated by the methods usual in such condensations, for example by filtering the cooled reaction mixture. If necessary, substances promoting precipitation are added; the excess amine is possibly separated previously. If the dyestuff is in the form of the anthraquinone sulphonic acid, then this is converted by the usual methods into the alkali metal salts.

The alkali salts, for example the lithium, potassium, sodium and also the ammonium salts of the anthraquinone dyestuffs produced according to the present invention dissolve in hot water with a blue colour. They dye wool from a neutral to weakly acid bath in reddish-blue shades which have good light and wet fastness properties. Also other polypeptide fibres of both natural and synthetic origin can be fast dyed as well as wool. The dyeings are also distinguished by their vividness of shade.

The following examples serve to illustrate the invention. Where not otherwise stated, parts are given as parts by weight and the temperatures are in degrees centigrade. The relationship of parts by weight to parts by volume is as that of kilogrammes to litres.

*Example 1*

A mixture of 40 parts of the sodium salt of 1-amino-4-bromo-anthraquinone-2-sulphonic acid, 90.8 parts of 3.4′.5-trimethyl-4-amino-1-phenoxybenzene, 800 parts of water, 500 parts by volume of of ethyl alcohol and 20 parts of sodium bicarbonate is lightly boiled and, at the reaction temperature, 1.2 parts of copper-(1)-chloride are added. The whole is then lightly refluxed for 24 hours at the end of which time the condensation is complete. The condensation product is then cooled to room temperature, enough hydrochloric acid is added to make the reaction solution turn Congo red paper blue and the mixture of dyestuff acid formed and excess, non-reacted amine is filtered under suction. The residue is then boiled out with hot diluted hydrochloric acid and the dyestuff of the formula:

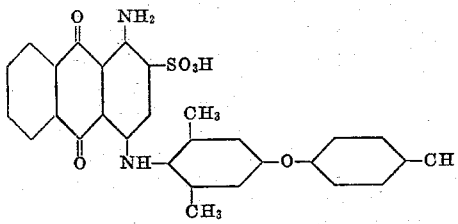

is filtered off under suction. The dyestuff acid is converted into its sodium salt in aqueous solution with sodium carbonate and then precipitated with sodium chloride. The sodium salt is a dark, blue powder; it dissolves in water and in concentrated sulphuric acid with a blue colour and dyes wool, silk and polyamide fibres from a neutral bath in very fast, reddish-blue shades.

If, instead of 90.8 parts of 3.4′.5-trimethyl-4-amino-1-phenoxybenzene, 85.2 parts of 3.5-dimethyl-4-amino-1-phenoxybenzene or 99 parts of 3.5-dimethyl-4′-chloro-4-amino-1-phenoxybenzene or 122 parts of 3.5-dimethyl-4′-phenoxy-4-amino-1-phenoxybenzene or 105.2 parts of 3.5-dimethyl-4-amino-1-(1′- or -2′-naphthyloxy)-benzene are condensed with the sodium salt of 1-amino-4-bromo-anthraquinone-2-sulphonic acid, then dyestuffs are obtained which dye wool from a neutral bath in blue shades. The wet and light fastness properties of these dyestuffs are also good.

Similar dyestuffs are obtained if, in the above example, 48.3 parts of the sodium salt of 1-amino-4.6-dibromo-anthraquinone-2-sulphonic acid or 39.4 parts of the sodium salt of 1-amino-4.6-dichloro-anthraquinone-2-sulphonic acid or 43.8 parts of the sodium salt of 1-amino-4-bromo-7-chloro-anthraquinone-2-sulphonic acid or 47.3 parts of the sodium salt of 1-amino-4-bromo-6.7-dichloro-anthraquinone-2-sulphonic acid are used instead of the 40 parts of the sodium salt of 1-amino-4-bromo-anthraquinone-2-sulphonic acid.

*Example 2*

An alcoholic solution of 90.8 parts of 2.4.6-trimethyl-3-amino-1-phenoxybenzene in 600 parts by volume of ethyl alcohol is poured into a hot solution of 40 parts of the sodium salt of 1-amino-4-bromo-anthraquinone-2-sulphonic acid in 600 parts of water, 20 parts of sodium bicarbonate and 1.5 parts of copper bronze are added and the whole is condensed at the light boil for several hours. The condensation product is then cooled to room temperature, sufficient diluted hydrochloric acid is added to turn Congo red paper blue and then the dyestuff acid of the formula:

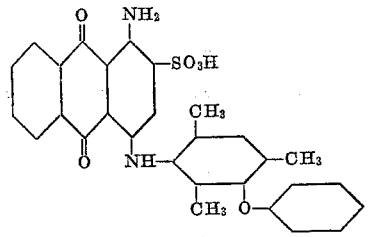

is filtered off under suction. To further purify the dyestuff the compound obtained is pasted in hot diluted hydrochloric acid, filtered off under suction and freed from further side products by redissolving the sodium salt several times in water and precipitating with sodium chloride. The pure sodium salt so obtained is a dark blue powder which dissolves in water and in concentrated sulphuric acid with a blue colour and dyes wool and silk from a neutral bath in blue shades which are fast to light and milling.

In the above example, 85.2 parts of 2.4-dimethyl-3-amino-1-phenoxybenzene are used instead of 90.8 parts of 2.4.6-trimethyl-3-amino-1-phenoxybenzene, then a blue dyestuff which draws well from a neutral bath is also obtained, the wool dyeing of which has good fastness to washing, milling and light.

The first-named dyestuff is also obtained if 38.1 parts of 1-amino-2.4-dibromo-anthraquinone is condensed with 45.4 parts of 2.4.6-trimethyl-3-amino-1-phenoxybenzene in 50 parts of N-amyl alcohol in the presence of 11 parts of anhydrous potassium acetate and 1 part of copper acetate and then the 1-amino-2-bromo-4-(2′,4′,6′-trimethyl-3′-phenoxyanilido)-anthraquinone obtained in a pure form by recrystallisation from N-butyl alcohol is reacted in the usual way at a raised temperature in the presence of phenol, with 50% potassium sulphite solution to form the corresponding sulphonic acid. The phenol is then removed with steam and, after filtering off a slight residue, the dyestuff is precipitated from the hot aqueous solution with sodium chloride and is obtained in the form of the sodium salt.

*Example 3*

42 parts of the potassium salt of 1-amino-4-bromo-anthraquinone-2-sulphonic acid, 90.8 parts of 3.4′.5-trimethyl-2-amino-1-phenoxybenzene, 20 parts of sodium bicarbonate and 1.2 parts of copper bronze are stirred while boiling under reflux for 48 hours in a mixture of 500 parts by volume of water and 500 parts by volume of ethyl alcohol. On completion of the reaction, sufficient hydrochloric acid is added to turn Congo red paper blue and the precipitated dyestuff acid of the formula:

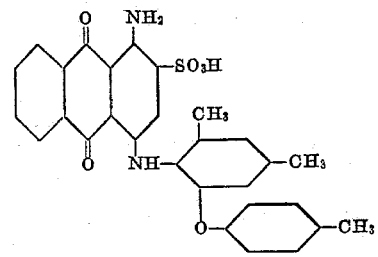

is filtered off under suction. To further purify, the residue is stirred with hot diluted hydrochloric acid, filtered and the dyestuff acid in aqueous suspension is converted into the sodium salt with the aid of sodium carbonate. The dyestuff salt isolated with sodium chloride is a dark blue powder which dissolves in concentrated sulphuric acid with a cloudy, blue-green and in water with a reddish-blue colour. From a neutral bath it produces a reddish-blue dyeing on wool which has good wet fastness properties.

If, instead of 90.8 parts of 3.4'.5-trimethyl-2-amino-1-phenoxybenzene, 85.2 parts of 3.5-dimethyl-2-amino-1-phenoxybenzene or 79.6 parts of 3-methyl-2-amino-1-phenoxybenzene or 93.4 parts of 3-methyl-2-amino-4'-chloro-1-phenoxybenzene are used then similar blue dyestuffs are obtained which draw well from a neutral bath and produce wool dyeings which are fast to milling.

*Example 4*

40 parts of the sodium salt of 1-amino-4-bromo-anthraquinone-2-sulphonic acid, 97.2 parts of 3.4'.5-trimethyl-4-amino-1-thiophenoxybenzene, 20 parts of sodium bicarbonate and 1.5 parts of copper-(1)-chloride are heated for several hours at 80° in a mixture of 400 parts of water and 200 parts by volume of alcohol. On completion of the reaction, the solution is made weakly acid (Congo red paper turns slightly blue), the dyestuff acid which precipitates the formula:

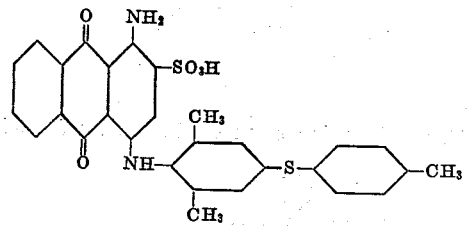

is isolated, adherent amine is removed by washing with hot diluted hydrochloric acid and it is then washed with hot water until the filtrate has a neutral reaction. To purify, the dyestuff is taken up in water, neutralised and the dyestuff salt is precipitated by the addition of sodium chloride.

The dyestuff dissolves in sulphuric acid with a greyish-blue and in water with a reddish-blue colour. From a neutral bath it produces a reddish-blue wool dyeing which has good fastness properties.

If the 97.2 parts of 3.4'.5-trimethyl-4-amino-1-thiophenoxybenzene are replaced by 91.6 parts of 3.5-dimethyl-4-amino-1-thiophenoxybenzene, then a dyestuff having very similar shade and wool dyeings having the same good fastness properties are obtained.

*Example 5*

A mixture of 38.1 parts of 1-amino-2.4-dibromo-anthraquinone, 48.2 parts of 2.3.5.6 - tetramethyl - 4-amino-1-phenoxybenzene, 11 parts of anhydrous potassium acetate, 0.8 part of copper-(1)-chloride and 50 parts by volume of n-amyl alcohol is refluxed for 24 hours. The condensation product is diluted with 300 parts by volume of methyl alcohol, the precipitate is filtered off under suction, crystallised from n-amyl alcohol and 1-amino-2-bromo-4-(2'.3'.5'.6'-tetramethyl-4'-phenoxyanilido)-anthraquinone is obtained in crystalline form (M. P. 262–263°). It is converted into the 2-sulphonic acid by heating 1 part thereof with 2 parts of 50% potassium sulphite solution and 5 parts of phenol in a bomb tube for 24 hours at 140–145°. On completion of the reaction, the phenol is distilled off with steam, the distillation residue is diluted with hot water, a slight insoluble residue is filtered off and the dyestuff of the formula:

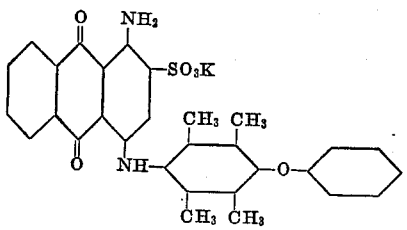

is precipitated with sodium chloride. It is a dark blue powder which dissolves in concentrated sulphuric acid and water with a blue colour and dyes wool, silk, and polyamide fibres from a neutral bath in reddish-blue shades which are fast to milling and light.

If instead of 48.2 parts of 2.3.5.6-tetramethyl-4-amino-1-phenoxybenzene, 51 parts of 2.2'.3.5.6-pentamethyl-4-amino-1-phenoxybenzene are condensed, then a blue dyestuff which draws well from a neutral bath is obtained which also has good fastness properties.

*Example 6*

2 parts of copper acetate are added to a solution of 40 parts of the sodium salt of 1-amino-4-bromo-anthraquinone-2-sulphonic acid, 96.4 parts of 3.5-diethyl-4-amino-1-phenoxybenzene and 20 parts of sodium bicarbonate in 400 parts of water and 400 parts by volume of alcohol and the whole is boiled for some hours while stirring.

On completion of the reaction, the solution is acidified with hydrochloric acid, the precipitated dyestuff of the formula:

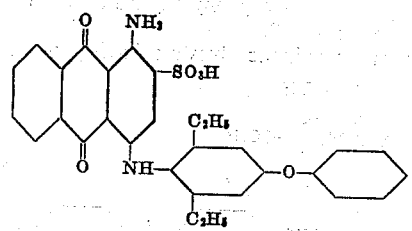

is isolated and washed with hot diluted hydrochloric acid. The dyestuff acid in water is converted into the sodium salt with caustic soda and precipitated from the dark blue solution by the addition of sodium chloride.

The dyestuff dissolves in sulphuric acid and water with a blue colour and dyes wool, silk and polyamide fibres from a neutral bath in clear, reddish-blue shades which have very good wet fastness properties.

If the 96.4 parts of 3.5-diethyl-4-amino-1-phenoxybenzene are replaced by 90.8 parts of 3-ethyl-5-methyl-4-amino-1-phenoxybenzene or by 110.2 parts of 3.5-diethyl-4-amino-4'-chloro-1-phenoxybenzene or by 108.4 parts of 3.5-diethyl-4-amino-4'-methoxy-1-phenoxybenzene or by 133.2 parts of 3.5-diethyl-4-amino-4'-phenoxy-1-phenoxybenzene or by 116.4 parts of 3.5-diethyl-4-amino-1-(1'- or 2'-naphthyloxy)-benzene, then dyestuffs are obtained which dye wool, silk and polyamide fibres in blue shades which have similarly good fastness properties.

*Example 7*

100 parts of wool flannel are entered at 40–45° into a dyebath containing 1 part of the dyestuff according to Example 1, 3 parts of ammonium sulphate and 10 parts of Glauber's salt in 3000 parts of water. The bath is gradually brought to the boil within 45 minutes, kept at the light boil for half an hour and then the dyed goods are rinsed.

A very even, reddish-blue wool dyeing is obtained which has very good fastness properties.

Similar dyeings are obtained with the dyestuffs according to the other examples.

What we claim is:

1. The anthraquinone dyestuff having the general formula:

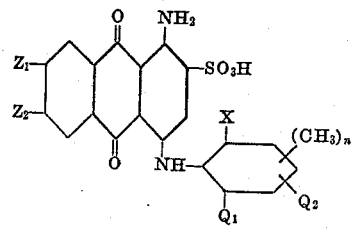

wherein one of $Q_1$ and $Q_2$ represents a member selected from the group consisting of phenyloxy, phenylthio and naphthyloxy radicals and the other represents a member selected from the group consisting of hydrogen and lower alkyl radicals, X represents a lower alkyl radical, $Z_1$ and $Z_2$ each represent a member selected from the group consisting of hydrogen and halogen, $n$ is one of the numerals 0 to 2, and wherein $Q_1$ is always different from hydrogen.

2. The anthraquinone dyestuff having the general formula:

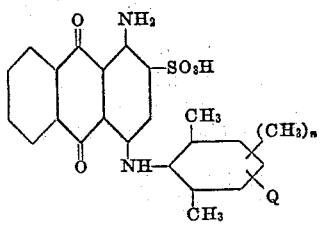

wherein Q represents a phenyloxy radical, and $n$ is one of the numerals 0 to 2.

3. The anthraquinone dyestuff having the formula:

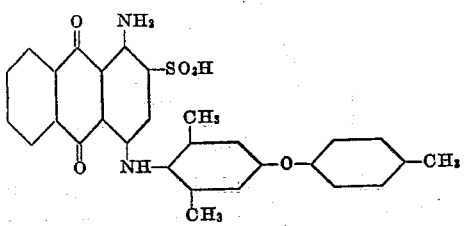

4. The anthraquinone dyestuff having the formula:

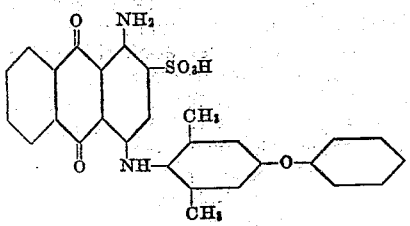

5. The anthraquinone dyestuff having the formula:

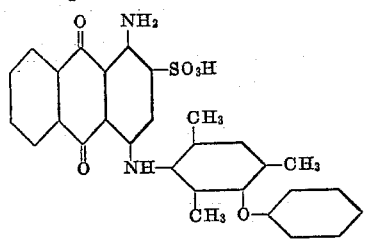

6. The anthraquinone dyestuff having the formula:

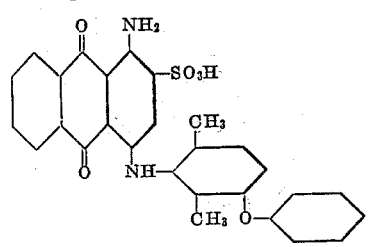

7. The anthraquinone dyestuff having the formula:

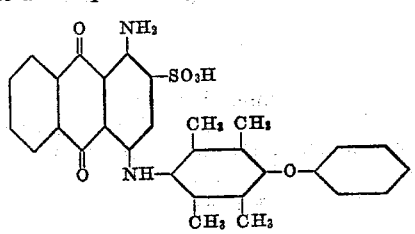

References Cited in the file of this patent

UNITED STATES PATENTS 2,412,790    Von Allmen et al. _____ Dec. 17, 1946

FOREIGN PATENTS 150,925    Switzerland _____ Feb. 1, 1932